United States Patent [19]

Stapleton et al.

[11] Patent Number: 5,688,087

[45] Date of Patent: Nov. 18, 1997

[54] PICK-UP BED RAIL ASSEMBLY

[75] Inventors: Craig A. Stapleton, Clarkston; Stephen Peter Siivola, Fenton, both of Mich.

[73] Assignee: Advanced Accessory Systems LLC, Sterling Heights, Mich.

[21] Appl. No.: 556,027

[22] Filed: Nov. 13, 1995

[51] Int. Cl.⁶ ..................................... B60P 7/15
[52] U.S. Cl. ...................... 410/150; 410/143; 410/149
[58] Field of Search ........................ 410/143, 144, 410/145, 149, 150, 152; 248/200.1; 296/40; 211/105.1, 105.6, 162, 94, 4; 224/403, 405, 551; 70/19, 94, 221, 222, 223

[56] References Cited

U.S. PATENT DOCUMENTS

| 466,940 | 1/1892 | Fowler et al. ................ 211/105.6 |
|---|---|---|
| 1,951,660 | 3/1934 | Klaudt . |
| 2,468,101 | 4/1949 | Nampa ............................ 410/150 |
| 2,575,751 | 11/1951 | Donnelley ...................... 410/149 |
| 3,992,907 | 11/1976 | Pilvet ............................. 70/222 |
| 4,133,465 | 1/1979 | Bott . |
| 4,168,667 | 9/1979 | Loomis ...................... 410/144 X |
| 4,441,344 | 4/1984 | Kurpershoek .................. 70/221 X |
| 4,464,089 | 8/1984 | Allen ........................... 410/143 X |
| 4,650,383 | 3/1987 | Hoff .............................. 410/150 X |
| 4,702,653 | 10/1987 | Gaulding et al. ............. 410/150 X |
| 4,938,403 | 7/1990 | Cortelli . |
| 4,969,784 | 11/1990 | Yanke ............................... 410/104 |
| 5,071,050 | 12/1991 | Pudney et al. . |
| 5,197,642 | 3/1993 | Cortelli . |
| 5,228,736 | 7/1993 | Dutton . |
| 5,388,434 | 2/1995 | Kalis ............................. 70/223 X |
| 5,443,190 | 8/1995 | Cucheran et al. . |
| 5,509,764 | 4/1996 | Shives ........................ 410/149 X |

*Primary Examiner*—Frank E. Werner
*Assistant Examiner*—Stephen Gordon

[57] ABSTRACT

A pick-up bed rail assembly for a truck box includes a pair of elongate rails which are mounted to the sides of a truck box. A telescoping cross member is received in each elongate rail and moves along the rails by means of a plurality of rollers positioned between the cross member and the rails. A locking mechanism is provided for securing the cross bar to the rails in order to prevent cargo theft. The locking mechanism includes a knob which is freely rotatable when the mechanism is locked.

11 Claims, 8 Drawing Sheets

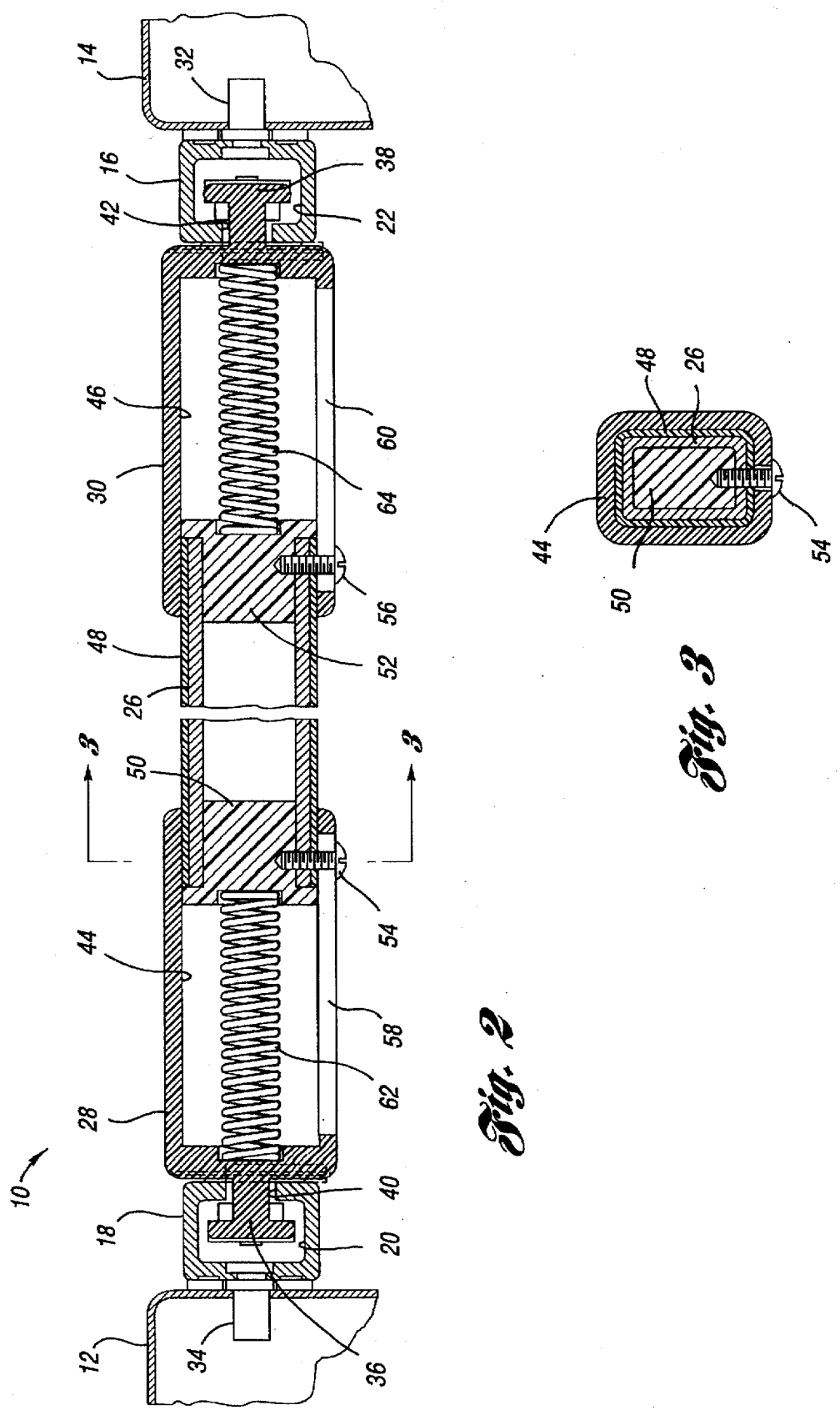

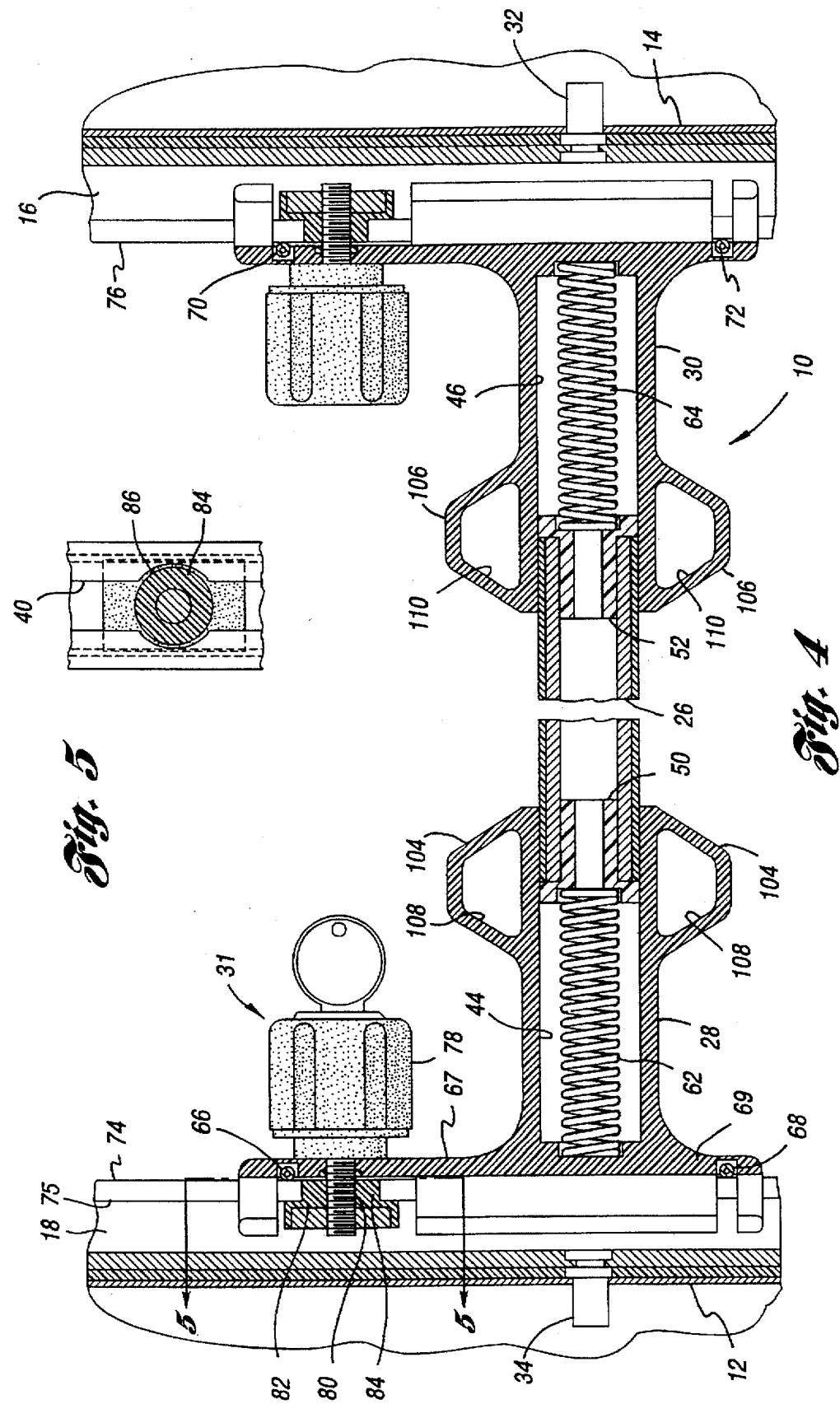

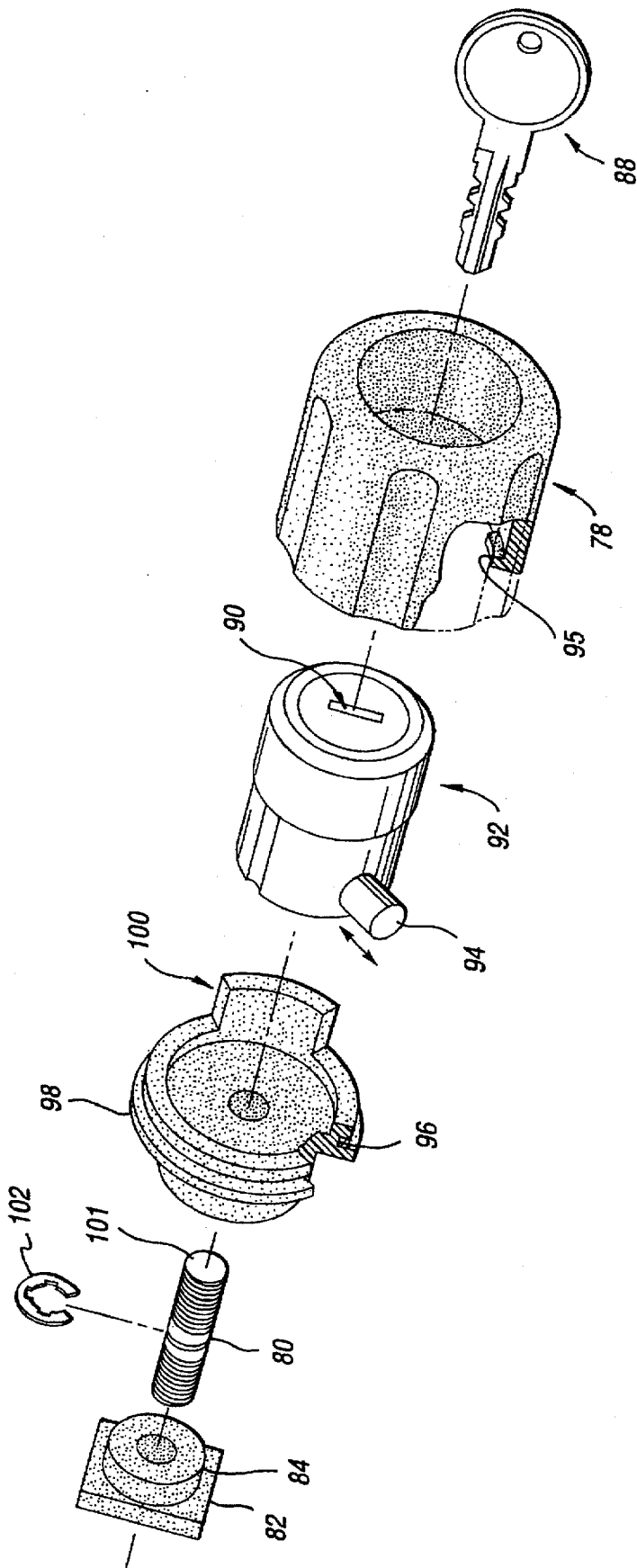

PICK-UP BED RAIL ASSEMBLY

TECHNICAL FIELD

The present invention relates to cargo securing rails, and more particularly to adjustable cargo securing rails for a pick-up truck box.

BACKGROUND OF THE INVENTION

Pick-up trucks, and similar vehicles, are often fitted with cargo restraint systems which provide means for securing cargo in the pick-up truck box. Some designs include cross bars which are secured to side rails for longitudinal movement along the truck box. Such cargo restraint systems are useful for securing loads in the truck, and adjustable positioning of the cross bar along the truck bed provides secure support for varying cargo configurations. However, the previous apparatuses were designed for strength, and had impeded manipulation of the cross bar, particularly when the user is positioned at the side of the bed.

For example, one such cargo restraining device is disclosed in U.S. Pat. No. 5,228,736 to Dutton. The '736 patent discloses a truck box top molding which includes a pair of rails mounted to the tops of the sides of a pick-up truck box. A cross bar is slidably mounted in each rail for movement longitudinally along the truck box. This design protrudes from the top of the truck box, and is adapted to receive a tonneau cover. The cross bar has a hook slot receiving a flange on the rail that induces friction during sliding movement, particularly when the cross bar is grasped at one end from the side of the vehicle. Furthermore, the design does not include a locking mechanism for preventing cargo theft.

DISCLOSURE OF THE INVENTION

The present invention overcomes the above disadvantages by providing a pick-up bed rail assembly for a truck box including a pair of elongate rails which are mounted to the sides of a truck box and a telescoping cross member received in each elongate rail and between the sidewalls. The cross member carries a plurality of rollers positioned for exposure between adjacent surfaces on the cross member and the rails. Preferably, a locking mechanism is provided for securing the cross bar to prevent cargo theft.

In the preferred embodiment, the present invention provides a pick up bed rail assembly for a truck box where the rail assembly includes a pair of elongate rails adapted for attachment to the side walls of the truck box, each elongate rail forming an internal passageway therein. A telescoping cross member having first and second ends is operatively connected at each end for cooperation within each internal passageway. A plurality of rollers is carried by either the cross member or the rails for rolling against the other of the cross member and rails for rollingly supporting the cross member with respect to the rails. A locking mechanism is secured to the cross member for locking the cross member with respect to the rails.

The present invention further provides a pick-up bed rail assembly in a truck box, the truck box including a pair of sidewalls. The rail assembly includes a pair of elongate rails secured to the pair of sidewalls, each rail forming an internal passageway therein. A telescoping cross member is operatively connected at each end for cooperation with each internal passageway. A plurality of rollers are carried by the cross member on a surface adjacent to a rail surface for rollingly supporting the cross member. A locking mechanism secures the cross member to one of the rails. Preferably, the locking mechanism comprises a rotatable knob which free wheels when locked to prevent movement of the cross member along the rails.

An object of the present invention is to provide a pick-up bed rail assembly for a truck box including a telescoping cross member that slides smoothly along the side rails for longitudinal movement along the truck box, even when grasped at only one end of the cross member.

A further object of the present invention is to provide a pick-up bed rail assembly with a locking mechanism which prevents movement of the cross member along the rails to discourage cargo theft.

The above objects and other objects, features and advantages of the present invention will be apparent when the following description is read in conjunction with the accompanying drawings and the appended claims.

BRIEF DESCRIPTION OF THE DRAWINGS

FIG. 2 shows a sectional view along the line 2—2 in FIG. 1;

FIG. 3 shows a vertical cross-section taken through line 3—3 of FIG. 2;

FIG. 4 shows a sectional plan view of a pick-up bed rail assembly shown in FIGS. 1–3;

FIG. 5 shows a vertical cross-section taken through line 5—5 in FIG. 4;

FIG. 6 shows an enlarged exploded perspective view of a locking mechanism shown in FIG. 4;

DETAILED DESCRIPTION OF THE PREFERRED EMBODIMENT

Figure 1:
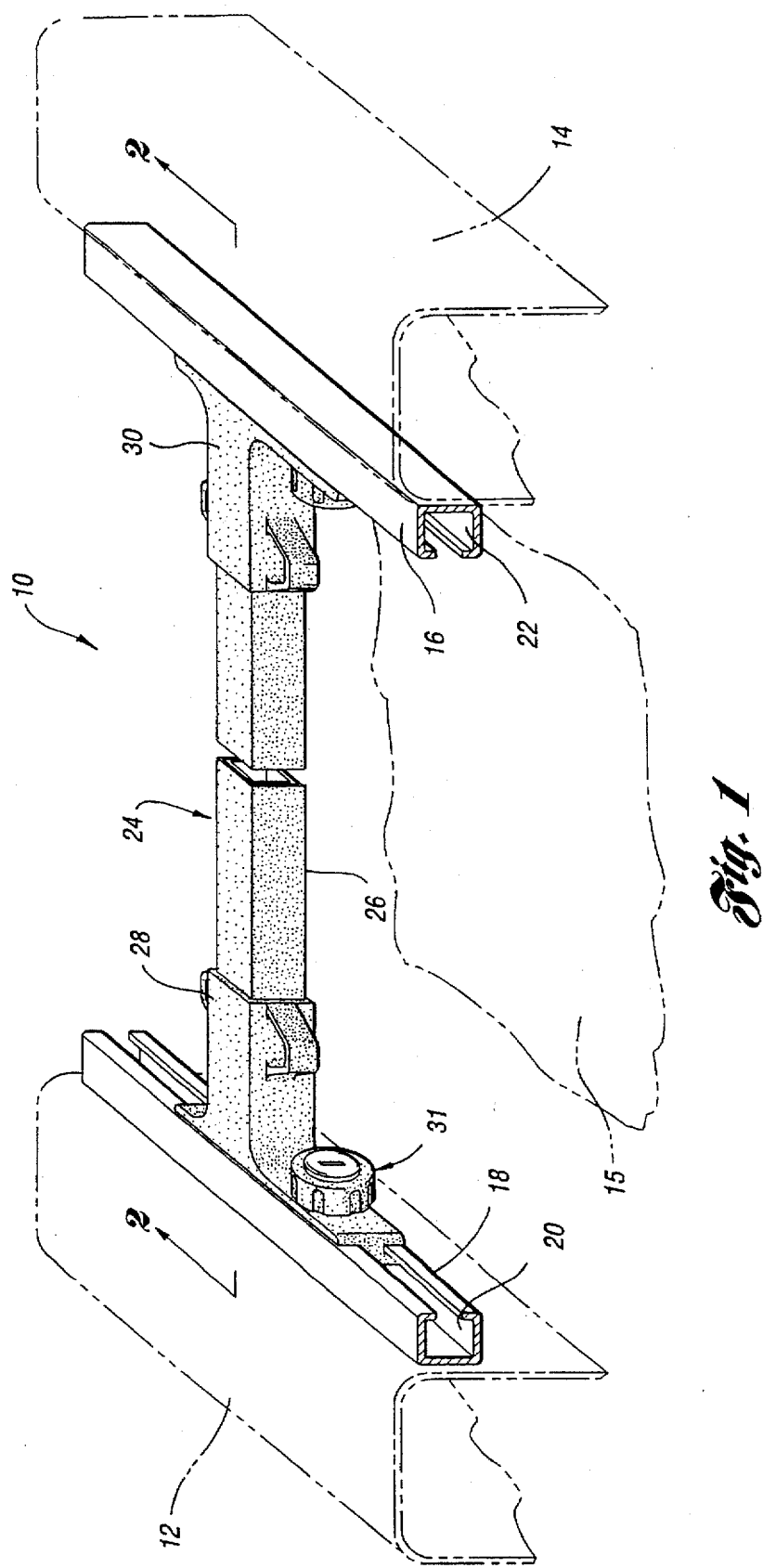
FIG. 1 shows a partially cutaway perspective view of a pick-up bed rail assembly in a pick-up truck box in accordance with the present invention.

A pick-up bed rail assembly 10 is shown in FIG. 1 connected to the sidewalls 12,14 of a pick-up truck box 15. The pick-up bed rail assembly 10 includes a pair of elongate rails 16,18 connected to the respective sidewalls 12,14 of the truck box 15. Each rail 16, 18 has a substantially "C" shaped vertical cross-section, and forms an internal passageway, 20,22 therein. The rails 16,18 are connected to the sidewalls 12,14 of the truck box 15 by means of the nut and bolt assembly 32,34, respectively as shown in FIG. 2.

The pick-up bed rail assembly 10 further includes a telescoping cross member 24, which comprises a cross bar 26 having a plastic coating 48 thereon, as shown in FIG. 2. The cross bar 26 extends across the truck box 15 in order to secure articles within the truck box.

A pair of stanchions 28,30 slidably secure the cross bar 26 with respect to the side rails 16,18. Each of the stanchions 28,30 forms a sleeve 44,46 therein for slidably receiving the cross bar 26. The cross bar 26 includes a pair of plugs 50,52 secured to the ends thereof by screws 54,56 respectively. Each screw 54,56 travels in a slot 58,60 formed in the respective stanchion in order to allow the cross bar 26 to telescope with respect to both stanchions 28,30. A pair of springs 62,64 cooperate with the respective plugs 50,52 to bias the cross bar 26 away from each rail 16,18.

As a user slides the cross member 24 along the side walls 12,14 of the truck box, the cross bar 26 is allowed to telescope with respect to each sleeve 44,46 against the force of the springs 62,64. The screws 54,56 prevent the plugs 50,52 from exiting the sleeves 44,46.

The stanchions 28,30 include track members 36,38 extending therefrom through the slots 40,42 formed in the rails 16,18. The track members 36,38 extend into the internal passageways 20,22 in the respective rails with sufficient clearance to allow the track members 36,38 to move along the rails 16,18. Track members 36,38 have a first portion that is able to move axially through slots 40,42 and have a second portion which is prevented from moving axially through slots 40,42 because the second portion is larger than the slot, as shown in FIG. 2.

As shown in FIG. 4, each stanchion also includes a pair of legs 67,69 extending laterally from the sleeves 44,46 to form a "T" shape. This "T" shape greatly improves the stability of the bed rail assembly, thereby allowing easy sliding action along the truck box 15. Each stanchion further includes a pair of rollers 66,68,70,72 spaced a substantial distance from the respective sleeve 44,46. Rollers 66,68,70,72 are preferably mounted at least partially within the stanchions 28,30 on roller-pins secured to the stanchions 28,30.

The "T" shape of the stanchions, as well as the lateral spacing of the rollers contribute to provide a stable bed rail assembly which is easily slid along the side rails. The "T" shape in combination with the roller spacing provides sufficient stability to allow a user to stand along the outside of the truck box and merely grab the cross rail to slide the entire bed rail assembly along the truck box. The rollers 66,68 of stanchion 28 roll against the outer surface 74 of rail 18. Similarly, rollers 70,72 of stanchion 30 roll against the outer surface 76 of rail 16. Of course, the rollers could be placed in various positions, and may be either secured to the stanchions or the rails. The rollers 66,68,70,72 facilitate smooth movement of the stanchions 28,30 along the rails 16,18 as the cross member 24 is moved along the length of the truck bed.

The locking mechanism 31 includes a knob 78 which is selectively engageable with a clamp bolt 80 for locking the clamp nut 82 against the inner surface 75 of the rail 18 in order to secure the stanchion 28 in position with respect to the rail 18 in order to prevent theft. The clamp nut 82 includes a central portion 84, which extends through the aperture 86 formed in the slot 40 as shown in FIG. 5.

The locking mechanism 31 is more clearly shown in the exploded perspective view of FIG. 6. FIG. 6 shows a key 88, which enters the key hole 90 in the lock cylinder 92. The lock cylinder 92 is secured within the knob 78, and includes a lock bar 94 which is selectively extendable therefrom when the key 88 is rotated. The knob 78 includes a rib 95 extending inwardly therefrom for sliding engagement within the groove 96 formed on the lock plate 98. The lock plate 98 includes a dog 100 extending therefrom for engagement with the lock bar 94. The clamp bolt 80 is secured to the lock plate 98 and extends into the internally threaded central portion 84 of the clamp nut 82.

Accordingly, when the key 88 is rotated to lock a locking mechanism 31, the lock bar 94 is retracted into the lock cylinder 92, and the knob 78 is allowed to freely rotate. The rib 95 travels in the groove 96 of the lock plate 98 because the lock bar 94 is not extended to engage the dog 100. Accordingly, a user cannot disengage the locking mechanism when the mechanism is locked.

In order to unlock the locking mechanism 31, the key 88 is rotated to extend the lock bar 94 from the lock cylinder 92. When the lock bar 94 is extended from the lock cylinder 92, the knob 78 and lock cylinder 92 may be rotated to engage the lock bar 94 with the dog 100. At that point, further rotation of the lock cylinder 92 and lock bar 94 will cause rotation of the dog 100 and lock plate 98, which will rotate the clamp bolt 80 in order to cause the clamp nut 82 to retract, thus disengaging the locking mechanism. The end 101 of the clamp bolt 80 is peened over or flattened once inserted through the lock plate 98 in order to secure the clamp bolt 80 with respect to the lock plate 98. The retainer ring 102 is provided around the clamp bolt 80 to retain the lock plate 98 against the stanchion 28. With the clamp bolt 80 stationary axially, rotation of the clamp bolt 80 will cause the clamp nut 82 to move due to the internal threading of the central portion 84 of the clamp nut 82.

Therefore, when the lock bar 94 is extended from the lock cylinder 92, the locking mechanism 31 is unlocked, and the lock bar 94 may engage the dog 100 in order to rotate the clamp bolt 80 to move the clamp nut 82 to a clamped or unclamped position. When the lock bar 94 is not extended from the lock cylinder 92, the lock bar 94 cannot engage the dog 100, therefore the lock cylinder 92 and knob 78 are free wheeling with respect to the clamp bolt 80, thereby preventing disengagement of the clamp nut 82.

The stanchions 28,30 also include anchor members 104, 106 with apertures 108,110 formed therethrough for receiving cargo securing means, such as a rope or chain to secure a cargo load in the truck bed.

Figure 7:
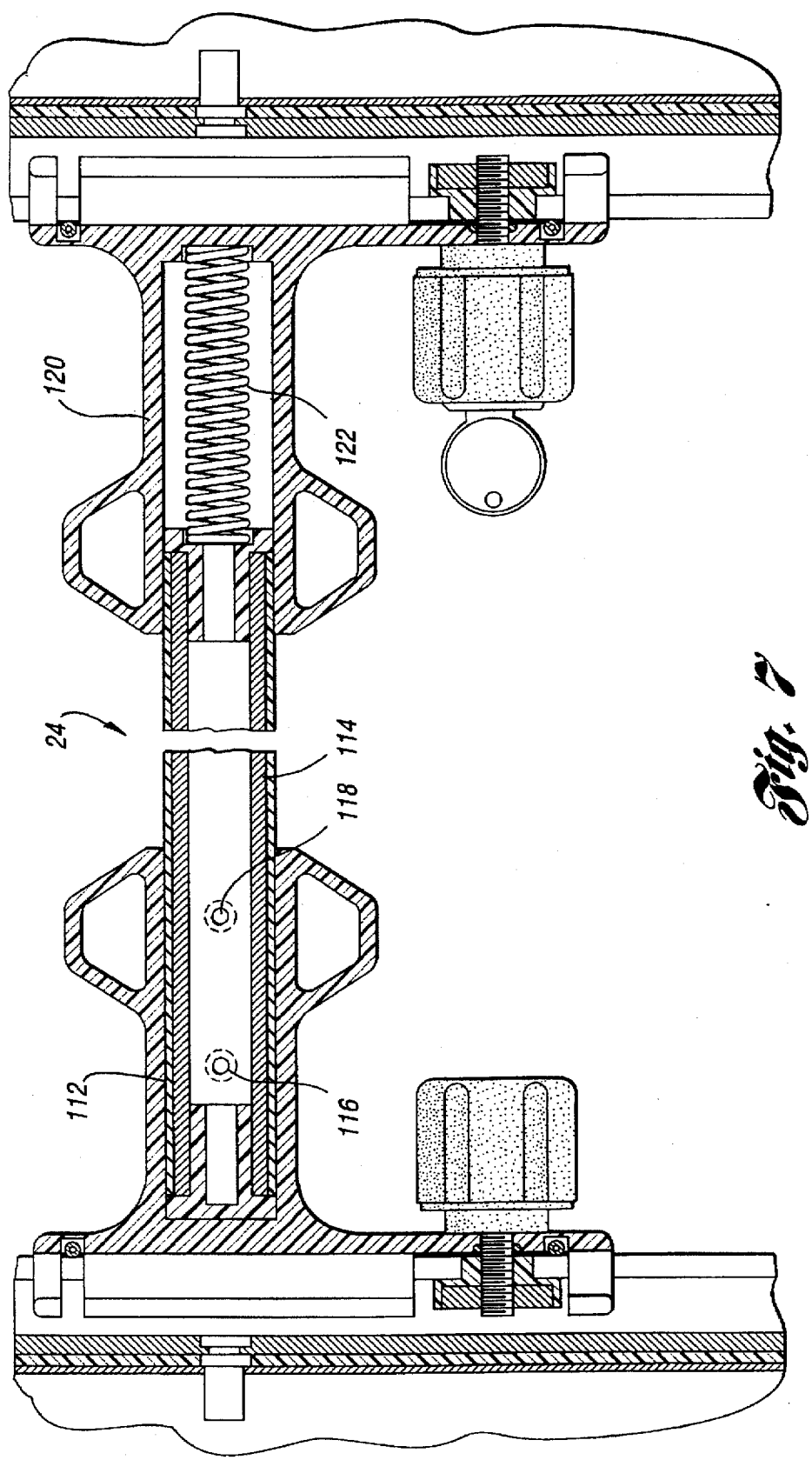
FIG. 7 shows a sectional plan view of an alternative embodiment of a pick-up bed rail assembly in accordance with the present invention.

FIG. 7 shows an alternative embodiment of a pick-up bed rail assembly in accordance with the present invention. This embodiment only telescopes at one end of the cross member 24. The first stanchion 112 is rigidly secured to the cross bar 114 by the attachment bolts 116,118. Accordingly, the cross bar 114 is fixed with respect to the first stanchion 112, and telescopes with respect to the second stanchion 120 against the force of the spring 122. The embodiment shown in FIG. 7 is otherwise identical to that shown in FIG. 4.

Figure 8:
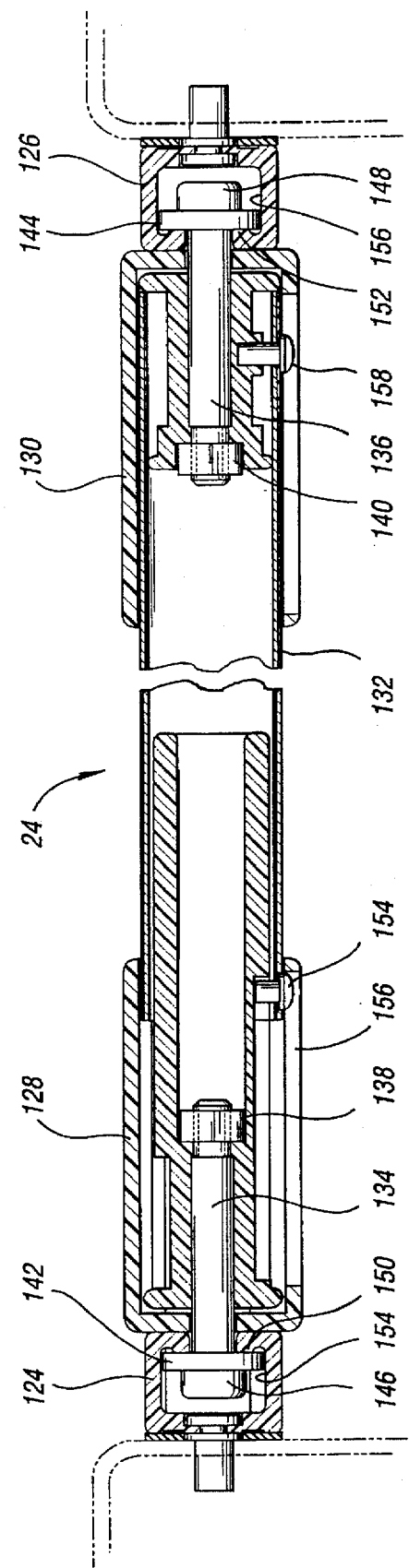
FIG. 8 shows a sectional plan view of another alternative embodiment of a pick-up bed rail assembly in accordance with the present invention.

FIG. 8 shows yet another alternative embodiment of the present invention. The embodiment shown in FIG. 8 utilizes an alternative roller arrangement for facilitating rolling movement of the telescoping cross member 24 along the side rails 124,126. First and second stanchions 128,130 carry the cross bar 132 along the side rails 124,126. Shoulder bolts 134,136 are threaded into rectangular nuts 138,140. Oversized washers 142,144 are provided on the shoulder bolts 134,136 to allow the stanchions 128,130 to roll along the side rails 124,126. The oversized washers 142,144 are positioned between the bolt heads 146,148 and the respective return legs 150,152 of the side rails 124,126. The oversized washers 142,144 roll along the lower surfaces 154,156 of the respective side rails 124,126.

In this embodiment, the first stanchion 128 allows telescoping movement of the cross bar 132 therein as the attachment screw 154 travels along the slot 156 formed in the first stanchion 128. The second stanchion 130 does not allow telescoping movement of the cross bar 132. The attachment screw 158 ridgedly secures the cross bar 132 with respect to the second stanchion 130.

Figure 9:
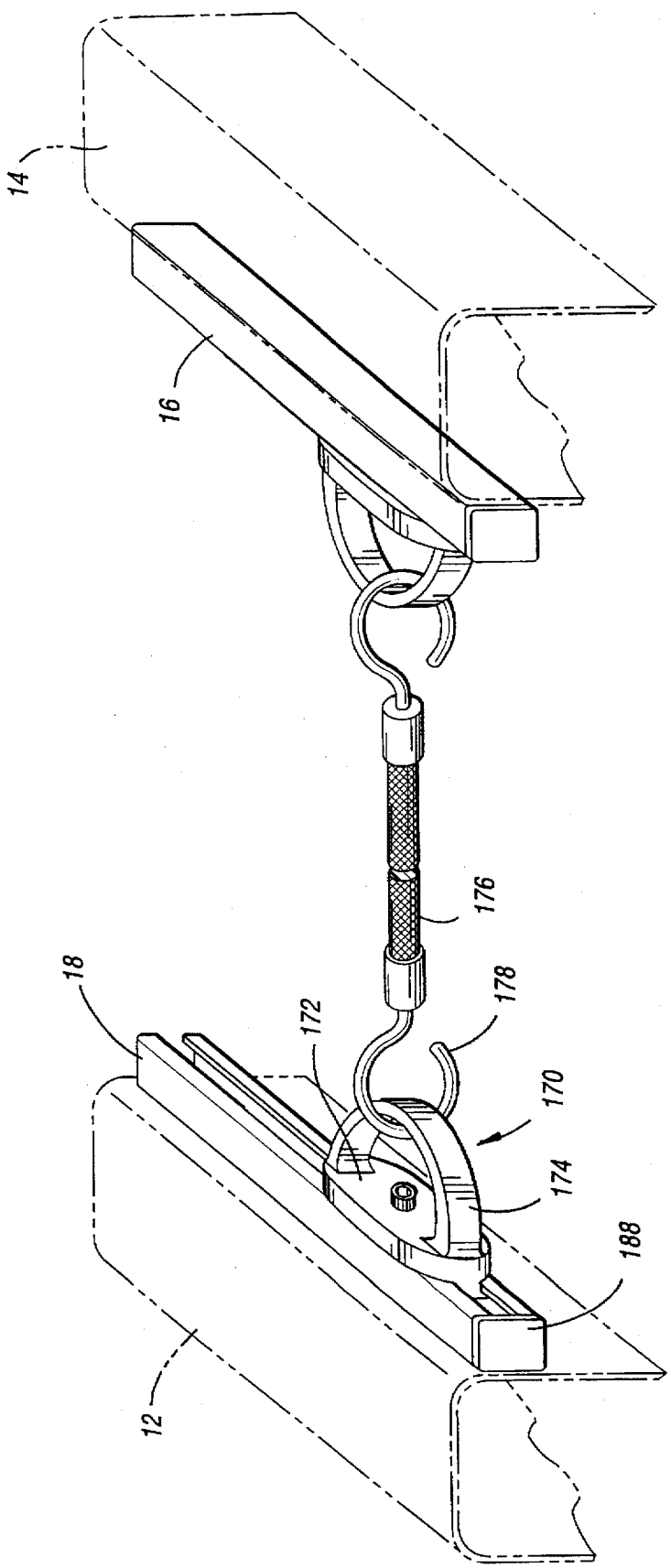
FIG. 9 shows a cut-away perspective view of a tie loop assembly secured to a side rail in accordance with yet another alternative embodiment of the present invention.
Figure 10:
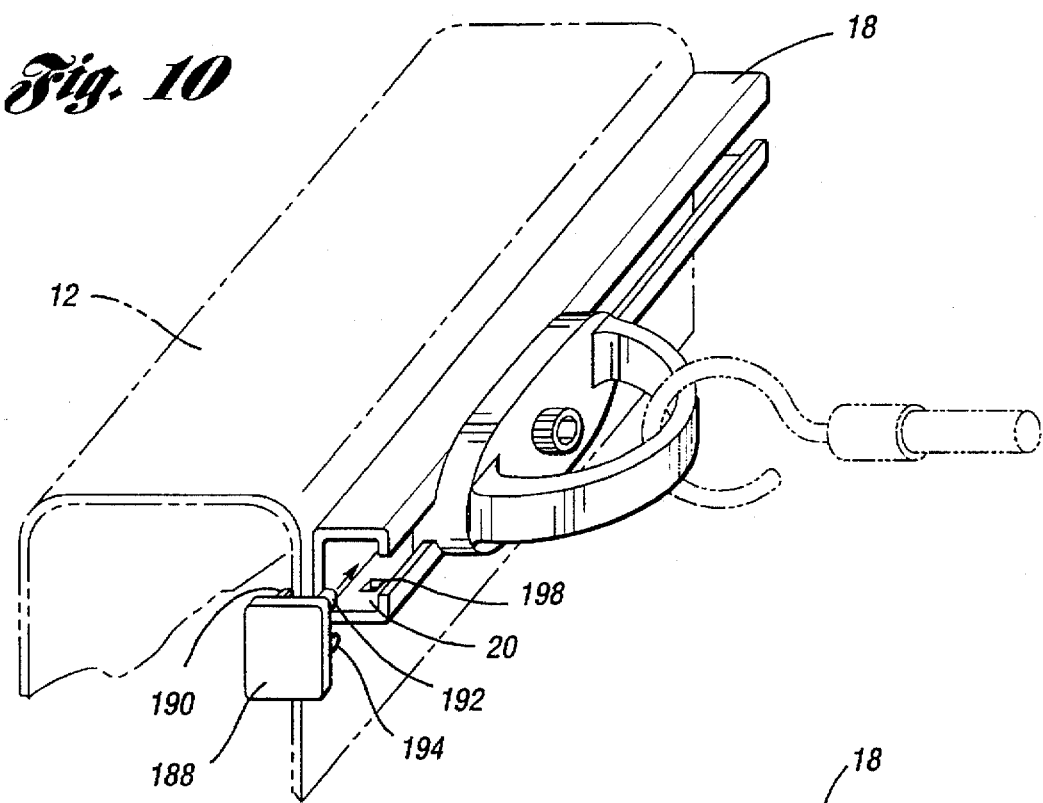
FIG. 10 shows a cut-away perspective view of the tie loop assembly of FIG. 9.
Figure 11:
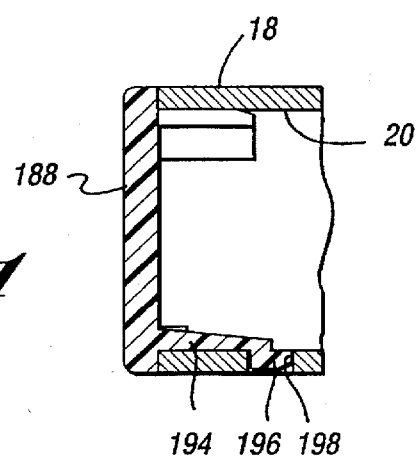
FIG. 11 shows a sectional view of the end cap and side rail of FIG. 10.
Figure 12:
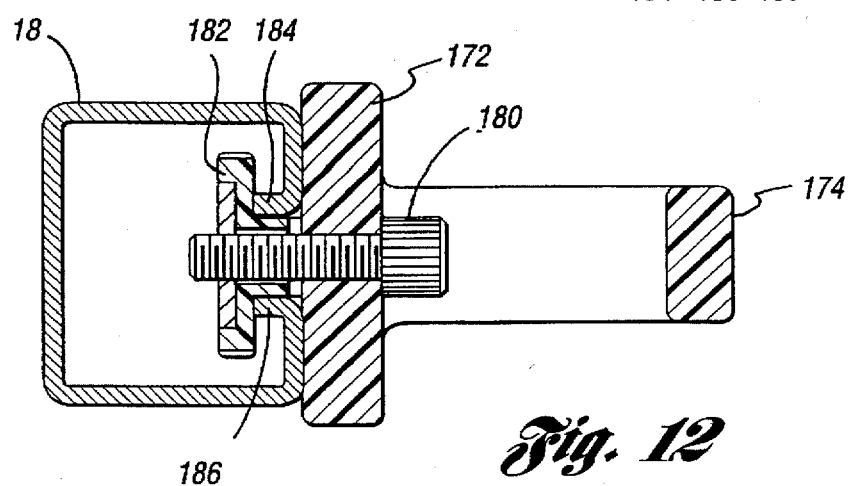
FIG. 12 shows a sectional view of the tie loop and side rail of FIG. 10.

FIG. 9 shows a cut-away perspective view of a tie loop assembly 170 secured to a side rail 18 in accordance with yet another alternative embodiment of the present invention. The tie loop assembly 170 includes a base 172 with a tie loop 174 extending therefrom for attachment to cargo securing means, such as a bungee cord 176 with attachment hooks 178. With reference to FIG. 12, the base 172 includes an attachment screw 180 which forces a bolt stop 182 against return legs 184,186 of side rail 18. In order to secure cargo in the truck bed, the attachment screw 180 is tightened when the tie loop assembly 170 is in a desired longitudinal position along the truck bed, and appropriate attachment devices, such as ropes or bungee cords, are fed through the tie loop 174 for securing the cargo.

This embodiment also comprises an end cap 188 which is removably securable to an end of the side rail 18. The end cap 188 includes upper legs 190,192 for stabilizing the end cap 188 in the internal passageway 20 of the side rail 18. The end cap 188 also includes at least one lower leg 194 with a distended portion 196o The distended portion 196 of lower leg 194 is engageable within aperture 198 formed in the side rail 18 for securing the end cap 188 in position.

While the best mode for carrying out the invention has been described in detail, those familiar with the art to which this invention relates will recognize alternative designs and embodiments for practicing the invention. Thus, the above described preferred embodiment is intended to be illustrative of the invention which may be modified within the scope of the following appended claims.

What is claimed is:

1. A cargo restraint system for use in vehicles having side walls, the restraint comprising:
   a pair of elongate rails adapted for attachment to the side walls, each elongate rail forming an internal passageway therein;
   a telescoping cross member having first and second ends, and operatively connected at each said end for cooperation within each said internal passageway;
   said telescoping cross member comprising a cross bar having first and second ends and first and second stanchions, each said stanchion forming a sleeve for receiving a respective end of the cross bar, and each said stanchion including a track member for engagement within the respective internal passageway and a spring located between each said stanchion and the respective end of said cross bar to bias each end of said cross bar away from each said stanchion:
   a plurality of roller elements mounted at least partially within said cross member and rolling against said rails for rollingly supporting said cross member with respect to said rails, to facilitate movement of said cross member along said rails; and
   at least one locking mechanism for locking the telescoping cross member with respect to the elongate rails.

2. The cargo restraint system of claim 1, wherein each said rail forms a substantially "C" shaped channel therethrough.

3. The cargo restraint system of claim 1, wherein said roller elements comprise roller-pins secured to said stanchions.

4. The cargo restraint system of claim 1, wherein said locking mechanism comprises:
   a bolt extending through one of said stanchions adjacent the respective track member;
   a clamp nut engaged with said bolt for securing one of said rails against said one of said stanchions;
   a lockable knob secured to said bolt, said knob being freely rotatable with respect to said bolt when locked and fixed with respect to said bolt when unlocked; and
   whereby rotation of said knob causes said bolt to rotate with respect to said clamp nut when said knob is unlocked.

5. The cargo restraint system of claim 1, further comprising an anchor member secured to each said stanchion and having an aperture formed in each said anchor member adapted for receiving a cargo securing element.

6. A rail assembly for a vehicle, comprising:
   a pair of elongate rails adapted for attachment to the vehicle, each elongate rail forming a longitudinal internal passageway therein and having a longitudinal slot defining an opening for accessing said internal passageway;
   a cross member having first and second ends, and at least one track member operatively connected at each said end for cooperation within each said internal passageway and each said slot;
   a first portion of said track member being smaller than said slot to allow said first portion to move longitudinally and axially in said longitudinal slot while a second portion of said track member is located predominantly within said internal passageway and is larger than said slot to prevent said second portion from moving axially through said slot and out of said internal passageway; and
   a plurality of roller elements rotable relative to and carried by said cross member and rolling against said rails to facilitate movement of said cross member along said rails.

7. The rail assembly of claim 6, wherein said roller elements contact an outer surface of said rails.

8. The rail assembly of claim 6, further comprising a locking mechanism mounted on at least one of said cross member ends for maintaining said cross member in a desired location relative to said rails;
   said locking mechanism having a lockable knob secured to a bolt, said knob being freely rotatable with respect to said bolt when locked and fixed with respect to said bolt when unlocked.

9. The rail assembly of claim 6, wherein said cross member telescopes and further comprises:
   a cross bar having first and second ends; and
   first and second stanchions, each said stanchion forming a sleeve for receiving a respective end of the cross bar, and wherein said track members are mounted to each said stanchion.

10. The rail assembly of claim 9, wherein said roller elements are mounted at least partially within said first and second stanchions.

11. A cargo restraint system for use in vehicles having side walls, the restraint system comprising:
   a pair of elongate rails adapted for attachment to the side walls, each elongate rail forming an internal passageway therein;
   a telescoping cross member having first and second ends, and operatively connected at each said end for cooperation within each said internal passageway;
   wherein said telescoping cross member comprises a cross bar having first and second ends and first and second stanchions, each said stanchion forming a sleeve for receiving a respective end of the cross bar, and each said stanchion including a track member for engagement within the respective internal passageway;

a plurality of roller elements carried by said cross member and rolling against said rails for rollingly supporting said cross member with respect to said rails, to facilitate movement of said cross member along said rails; and a locking mechanism for locking the telescoping cross member with respect to the elongate rails, wherein said locking mechanism comprises:

a bolt extending through one of said stanchions adjacent the respective track member;

a clamp nut engaged with said bolt for securing one of said rails against said one of said stanchions;

a lockable knob secured to said bolt, said knob being freely rotatable with respect to said bolt when locked and fixed with respect to said bolt when unlocked; and whereby rotation of said knob causes said bolt to rotate with respect to said clamp nut when said knob is unlocked.

* * * * *